US008586659B2

(12) United States Patent
Jonschker et al.

(10) Patent No.: US 8,586,659 B2
(45) Date of Patent: Nov. 19, 2013

(54) REDISPERSIBLE SURFACED-MODIFIED PARTICLES

(75) Inventors: Gerhard Jonschker, Heppenheim (DE); Matthias Koch, Wiesbaden (DE); Joerg Pahnke, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 586 days.

(21) Appl. No.: 12/518,780

(22) PCT Filed: Nov. 16, 2007

(86) PCT No.: PCT/EP2007/009938
§ 371 (c)(1),
(2), (4) Date: Jun. 11, 2009

(87) PCT Pub. No.: WO2008/071286
PCT Pub. Date: Jun. 19, 2008

(65) Prior Publication Data
US 2010/0010137 A1    Jan. 14, 2010

(30) Foreign Application Priority Data
Dec. 11, 2006   (DE) .................... 10 2006 058 200

(51) Int. Cl.
C08K 3/22          (2006.01)
C08K 3/26          (2006.01)
(52) U.S. Cl.
USPC ........... 524/403; 524/407; 524/413; 524/418; 524/424; 524/430; 524/431; 524/432
(58) Field of Classification Search
USPC .......... 428/403–407; 524/403, 407, 413, 424, 524/430, 431, 432
See application file for complete search history.

(56) References Cited

U.S. PATENT DOCUMENTS

| | | | |
|---|---|---|---|
| 6,432,526 B1 * | 8/2002 | Arney et al. .................. | 428/328 |
| 2003/0012954 A1 * | 1/2003 | Schauer et al. ............... | 428/403 |
| 2003/0219597 A1 | 11/2003 | Carr et al. | |
| 2004/0191516 A1 | 9/2004 | Jiang et al. | |
| 2006/0046057 A1 | 3/2006 | Huber et al. | |
| 2006/0141254 A1 | 6/2006 | Kramer et al. | |
| 2006/0155007 A1 | 7/2006 | Huber | |
| 2007/0154709 A1 | 7/2007 | Koch et al. | |
| 2007/0166544 A1 | 7/2007 | Hennemann et al. | |
| 2007/0243145 A1 | 10/2007 | Andre et al. | |

FOREIGN PATENT DOCUMENTS

| | | |
|---|---|---|
| DE | 102 28 186 A1 | 1/2004 |
| DE | 102 43 438 A1 | 3/2004 |
| DE | 10 2004 020 767 A1 | 11/2005 |
| JP | 60-58237 A | 4/1985 |
| WO | WO 92/20441 A1 | 11/1992 |
| WO | WO 97/12942 A1 | 4/1997 |
| WO | WO 2004/052327 A2 | 6/2004 |
| WO | WO 2005/070820 A1 | 8/2005 |
| WO | WO 2005/075578 A2 | 8/2005 |
| WO | WO 2007/107222 A1 | 9/2007 |

OTHER PUBLICATIONS

International Search Report of PCT/EP2007/009938 (Mar. 9, 2009).

\* cited by examiner

*Primary Examiner* — Robert D. Harlan
(74) *Attorney, Agent, or Firm* — Millen, White, Zelano & Branigan, P.C.

(57) ABSTRACT

The present invention relates to surface-modified particles which can be dispersed in organic solvents, and to the use thereof for incorporation into polymers, paints and coatings.

14 Claims, No Drawings

REDISPERSIBLE SURFACED-MODIFIED PARTICLES

The present invention relates to surface-modified particles which can be dispersed in organic solvents, and to the use thereof for incorporation into polymers, paints and coatings.

Inorganic particles, in particular nanoparticles, are usually produced in aqueous dispersion and frequently have to be transferred into organic media. If, for example, the hydrophilic nanoparticle is brought into a non-polar environment too quickly, agglomeration of the particles occurs. It is particularly important here to obtain sufficiently high coverage of the particle surface with a hydrophobic surface modifier in order that the hydrophilic particles can be dispersed in a stable and agglomerate-free manner in a hydrophobic environment. However, this is associated with technical difficulties since the particles precipitate out of the hydrophilic solvent with increasing hydrophobicisation and are then no longer accessible for further coating. However, the coating that can be achieved up to precipitation is in most cases inadequate for agglomerate-free redispersal in the desired hydrophobic target solvent. For this reason, standard methods are usually based on very slow solvent exchange, often via mediating solvents in large amount. These multistep processes are slow and complex.

Alternative methods start from agglomerated nanoparticles and disperse these with use of high shear forces with simultaneous addition of surface modifiers.

The above-mentioned methods have the disadvantage that they are either very complex and cause high solvent consumption, or the methods require high shear forces, which do not ensure complete breaking up of the agglomerates.

There is therefore a demand for particles which can be produced in aqueous media and redispersed in organic media starting from these aqueous dispersions, and processes for the production thereof.

The present object is achieved by particles in accordance with the present invention and by processes for the production thereof.

Accordingly, the present invention relates firstly to the provision of surface-modified inorganic particles which are obtainable by a process in which, in a step a), inorganic particles and at least one surface modifier are reacted with one another in a solvent or solvent mixture, and, in a step b), the resultant reaction mixture is destabilised by the action of one or more external factors to give the surface-modified inorganic particles. The present invention likewise relates to processes for the production of surface-modified particles in which, in a step a), inorganic particles and at least one surface modifier are reacted with one another in a solvent or solvent mixture, and, in a step b), the resultant reaction mixture is destabilised by the action of one or more external factors to give the surface-modified inorganic particles. In a further embodiment of the present invention, the inorganic particles, in particular nanoparticles, can be suspended in a solvent or solvent mixture before application of the surface modifier, but it is also possible to employ suspensions of, for example, nanoparticles directly.

The solvent or solvent mixture in step a) encompasses water, alcohols, ketones and/or ethers, in particular water, isopropanol, acetone and/or THF.

An essential prerequisite for the present invention is controlled destabilisation of the reaction mixture by the action of one or more external factors which takes place in step b). For the purposes of the present invention, destabilisation means on the one hand destabilisation of the particles, which results in precipitation of the surface-modified particles and thus enables the particles to be separated off (and redispersed). On the other hand, destabilisation also means phase separation of two or more solvents, where the particles remain suspended in one of the solvents, preferably the organic solvent.

The particles according to the invention can optionally be separated off and/or dried. The operation of separating off can be carried out in all manners known to the person skilled in the art. In addition, it is furthermore possible to dry the particles and then to redisperse them again in organic solvents.

Only by means of the processes according to the invention is it possible to obtain nanoparticles which can be redispersed in any desired media and solvents, without major problems and losses of yield, in such a way that the measurable turbidity is significantly lower than that of a dispersion of unmodified particles.

Essential to the invention for the surface-modified nanoparticles is their good redispersibility and the transparency of the dispersions obtained therefrom. This transparency can be quantified via the turbidity of the dispersion, which is measured by means of a Lambda 900 UV/VIS/NIR spectrometer with 150 mm integration sphere. The dispersions are measured in transmission with a cell thickness of 0.5 cm. The directed and diffuse components are calculated. The smaller the diffuse component of the degree of transmission, the less turbid and thus more transparent the sample appears. The optical appearance of the samples is transparent (opalescent).

A chemical surface modification is preferably involved here, i.e. the surface modifier is covalently bonded to the surface of the nanoparticle.

Common processes for the production of surface-modified nanoparticles start from aqueous particle dispersions, to which the surface modifier is added. The coating of the surface enables destabilisation of the particle dispersion with formation of a precipitate, in particular if hydrophobic surface-coating agents are employed for compatibilisation with organic media. The precipitation separates the nanoparticle surface from the remaining modifier left in solution and suppresses preferred, substantially complete coating. This is particularly disadvantageous if the destabilisation occurs at a point in time when only a small part of the nanoparticle surface has been coated with the surface modifier. The particles obtained in this way tend towards agglomeration, i.e. they cannot be redispersed completely.

In accordance with the present invention, an adequate degree of coverage of the surface of the nanoparticles with the surface modifier can only be achieved if the destabilisation of the particle dispersion is controlled specifically, i.e. destabilisation of the suspension comprising the surface-modified nanoparticles is only initiated by the specific action of external factors. The destabilisation can preferably be controlled by external factors, such as, for example, a change in the pH after the surface modification, by addition of solvent or by addition of solubiliser to the particle dispersion, by adjustment of the temperature or by addition of a salt. In the case of the addition of solvents of different polarity as external factor, the polarity of the reaction mixture is increased, for example. The said procedures prevent premature destabilisation, which would result in an inadequate degree of coverage of the surface of the nanoparticles, and thus enables coating of the surface with the surface modifier to a desired degree of coverage. The specific destabilisation thus generally takes place at a later point in time than in the known processes, primarily through corresponding modification of the external factors.

In some embodiments, the particular challenge consists in that a reactive species must initially be formed from the surface modifier in an upstream reaction. This is the case, in particular, on use of alkoxysilanes, which have significantly higher reactivity to the particle surface if the alkoxide radical is in fully or partially hydrolysed form. It is then firstly the aim to achieve the most stable solution possible of the reactive form of the surface modifier, which is then rapidly brought to reaction with the nanoparticle surface and thus to destabilisation through modification of the external factor(s). This can be achieved, for example, by setting a pH close to the isoelectric point of the silane, at which hydrolysis of the alkoxy radicals proceeds rapidly, but crosslinking is inhibited. On later modification of the pH as external factor, the activated silanes then react very quickly and virtually quantitatively with the nanoparticle surface. The nanoparticles precipitated in this way have significantly better redispersibility than nanoparticles coated in a different reaction procedure.

In a further preferred embodiment, the surface modifier is a polymer, which is dissolved together with the dispersion of the particles; an additional solvent can be used here as solubiliser. Acetone is preferably employed as solubiliser. The solubiliser is employed in proportions of 1 to 50% by weight, based on the particle dispersion, preferably in proportions of 5 to 20% by weight. In common solution with the particles, the polymer can react with the surface thereof and functionalise the latter. The stability (solubility) of the polymer and thus of the modified particles is influenced via an external factor in such a way that precipitation thereof occurs. The external factor can be a change in the solvent composition, for example through removal of one component by distillation or preferably by addition of a non-solvent for the polymer which is miscible with the other solvents, or a temperature change.

Preference is given to the use of polymers containing a plurality of, particularly preferably containing one reactive group, which is able to react with the particle surface. In particular, the single reactive group can be a terminal silane on the polymer.

The functionalised, precipitated particles can be separated off comfortably from the solvent mixture and redispersed completely in a hydrophilic or hydrophobic, preferably hydrophobic, solvent (butyl acetate, xylene, aliphatic hydrocarbons). The surface coating represents not only compatibilisation with the target matrix (solvent, coating system or polymer melt), but can also effectively prevent agglomeration of dried particles.

In order to achieve destabilisation after coating has taken place, the addition of one or more salts, for example sodium chloride, is also suitable. Further, destabilisation can likewise be achieved by reducing or increasing the temperature. It is within the expert knowledge of the person skilled in the art to employ the suitable external factor for specific control of the destabilisation.

In a further embodiment of the present invention, the surface modifier is a so-called LCST or UCST polymer. The specific polymers mentioned are polymers which have a so-called "lower critical solution temperature" (LCST) or an "upper critical solution temperature" (UCST). Depending on the polymer used, a homogeneous mixture is produced here by heating or cooling. On reversal of the operation, the polymer precipitates on the particle surface, i.e. the external factor is in this case a change in the temperature.

Suitable LCST polymers for the present invention are, for example, those as described in WO 01/60926 and WO 03/014229. Particularly suitable LCST polymers are polyalkylene oxide derivatives, preferably polyethylene oxide (PEO) derivatives, polypropylene oxide (PPO) derivatives, olefinically modified PPO-PEO block copolymers, acrylate-modified PEO-PPO-PEO three-block copolymers, and polymers or derivatives thereof from the class of the polymethyl vinyl ethers, poly-N-vinylcaprolactams, ethyl(hydroxyethyl) celluloses, poly(N-isopropylacrylamide) and polysiloxanes. Particularly preferred LCST polymers are siloxane polymers or polyethers modified by means of olefinic or silanolic groups.

Suitable UCST polymers are, in particular, polystyrene, polystyrene copolymers and polyethylene oxide copolymers.

Preference is given to the use of LCST or UCST polymers containing solvolysable or functional groups which are able to form strong interactions and/or chemical bonds with the substrate or the application medium, such as, for example, the paint matrix. All functional groups known to the person skilled in the art are suitable, in particular silanol, amino, hydroxyl, olefin, hydroxyl, epoxy, acid anhydride and acid groups.

The LCST and UCST polymers preferably have molecular weights in the range from 300 to 500,000 g/mol, in particular from 500 to 20,000 g/mol.

Besides the external factors, the high degree of coverage of the surface, and thus the production of readily redispersible nanoparticles, can also be achieved through the use of corresponding surface modifiers. Suitable surface modifiers here are amphiphilic silanes, as described below. Here too, the person skilled in the art is of course free to control the destabilisation of the particle dispersion through the influence of additional external factors, as described above, on use of amphiphilic silanes.

Suitable particles are selected from the group consisting of hydrophilic and hydrophobic, in particular hydrophilic, particles, in particular nanoparticles, based on oxides, hydroxides, sulfides, sulfates, carbonates of silicon, titanium, zinc, aluminium, cerium, cobalt, chromium, nickel, iron, yttrium and/or zirconium, or metals, such as, for example, Ag, Cu, Fe, Au, Pd, Pt, or alloys coated with oxides or hydroxides of silicon. The particles based on oxides, hydroxides, sulfides, sulfates, carbonates of titanium, zinc, aluminium, cerium, cobalt, chromium, nickel, iron, yttrium and/or zirconium may optionally be coated with oxides or hydroxides of silicon. The individual oxides may also be in the form of mixtures. The particles preferably have an average particle size, determined by means of a Malvern ZETASIZER (dynamic light scattering) or transmission electron microscope, of 3 to 200 nm, in particular 20 to 80 nm and very particularly preferably 30 to 50 nm. In specific, likewise preferred embodiments of the present invention, the distribution of the particle sizes is narrow, i.e. the variation latitude is less than 100% of the mean, particularly preferably a maximum of 50% of the mean (according to the particle distribution function, determined by dynamic light scattering). Particular preference is given to the use of nanoparticles based on silicon dioxide.

Preference is also given to the use of nanohectorites, which are marketed, for example, by SüdChemie under the trade name Optigel® or by Laporte under the trade name Laponite®. Silica sols ($SiO_2$ in water), prepared from ion-exchanged water-glass, are furthermore also particularly preferred.

Suitable surface modifiers are, in particular, also organofunctional silanes, quaternary ammonium compounds, phosphonates, phosphonium and sulfonium compounds, copolymers, polymers or mixtures thereof. The surface modifiers are preferably selected from the group of the organofunctional silanes.

Preference is furthermore given to short-chain polymers (molecular weight (Mw) below 50,000 g/mol, in particular below 10,000 g/mol), which contain one or more, in particular only one, terminal trialkoxysilane, quaternary ammonium, phosphate, phosphonium and sulfonium group.

The requirements described of a surface modifier are met, in particular, in accordance with the invention by an adhesion promoter which carries two or more functional groups. One group of the adhesion promoter reacts chemically with the oxide surface of the nanoparticle. Alkoxysilyl groups (for example methoxy-, ethoxysilanes), halosilanes (for example chloro-) or acidic groups of phosphoric acid esters or phosphonic acids and phosphonic acid esters come into consideration here. The groups described are linked to a second functional group via a more or less long spacer. This spacer is a non-reactive alkyl chain, siloxane, polyether, thioether or urethane or a combination of these groups of the general formula $(C, Si)_n H_m (N, O, S)_x$, where n=1-50, m=2-100 and x=0-50. The functional group is preferably an acrylate, methacrylate, vinyl, amino, cyano, isocyanate, epoxide, carboxyl or hydroxyl group.

Silane-based surface modifiers are described, for example, in DE 40 11 044 C2. Phosphoric acid-based surface modifiers are obtainable, inter alia, as Lubrizol® 2061 and 2063 from LUBRIZOL (Langer & Co.). Suitable silanes are, for example, vinyltrimethoxysilane, aminopropyltriethoxysilane, N-ethylamino-N-propyldimethoxysilane, isocyanatopropyltriethoxysilane, mercaptopropyltrimethoxysilane, vinyltriethoxysilane, vinylethyldichlorosilane, vinylmethyldiacetoxysilane, vinylmethyldichlorosilane, vinylmethyldiethoxysilane, vinyltriacetoxysilane, vinyltrichlorosilane, phenylvinyldiethoxysilane, phenylallyldichlorosilane, 3-isocyanatopropoxytriethoxysilane, methacryloxypropenyltrimethoxysilane, 3-methacryloxypropyltrimethoxysilane, 3-glycidyloxypropyltrimethoxysilane, 1,2-epoxy-4-(ethyltriethoxysilyl)cyclohexane, 3-acryloxypropyltrimethoxysilane, 2-methacryloxyethyltrimethoxysilane, 2-acryloxyethyltrimethoxysilane, 3-methacryloxypropyltriethoxysilane, 3-acryloxypropyltrimethoxysilane, 2-methacryloxyethyltriethoxysilane, 2-acryloxyethyltriethoxysilane, 3-methacryloxypropyltris(methoxyethoxy)silane, 3-methacryloxypropyltris(butoxyethoxy)silane, 3-methacryloxypropyltris(propoxy)silane, 3-methacryloxypropyltris(butoxy)silane, 3-acryloxypropyltris(methoxyethoxy)silane, 3-acryloxypropyltris(butoxyethoxy)silane, 3-acryloxypropyltris(propoxy)silane, 3-acryloxypropyltris(butoxy)silane. Particular preference is given to 3-methacryloxypropyltrimethoxysilane. These and other silanes are commercially available, for example, from ABCR GmbH & Co., Karlsruhe, or Sivento Chemie GmbH, Düsseldorf.

Vinylphosphonic acid and diethyl vinylphosphonate may also be mentioned here as adhesion promoters.

In addition, suitable surface modifiers are also amphiphilic silanes of the general formula (I)

$$(R)_3Si-S_P-A_{hp}-B_{hb} \qquad (I)$$

where the radicals R may be identical or different and represent hydrolytically removable radicals,
$S_P$ denotes either O or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms,
$A_{hp}$ denotes a hydrophilic block,
$B_{hb}$ denotes a hydrophobic block and
where at least one reactive functional group is bonded to $A_{hp}$ and/or $B_{hb}$.

The amphiphilic silanes have the advantage that they combine a plurality of properties in themselves. They can, for example, provide particles with a surface having hydrophilic properties via the hydrophilic block and at the same time a surface having hydrophobic properties via the hydrophobic block. This results in self-organised switchability of the hydrophilicity/hydrophobicity, depending on the environment of the particle surface. In addition, the additional reactive functional group may form further bonds, for example to an ambient medium. The surface of the particles is thus adapted to a very wide variety of applications through a single modification and is thus compatible with all applications. In addition, the amphiphilic silanes, owing to the greater chain length, have increased mobility with respect to the alignment and orientation of the silanes, for example on a surface. This supports improved alignment of the respective regions of the amphiphilic silane interacting with the ambient medium and thus likewise improves the compatibility of the particles coated therewith a very wide variety of media.

An essential factor for the amphiphilic silanes according to the invention is the structure of the individual sub-units, as shown in formula (I).

The amphiphilic silanes contain a head group $(R)_3Si$, where the radicals R may be identical or different and represent hydrolytically removable radicals. The radicals R are preferably identical.

Suitable hydrolytically removable radicals are, for example, alkoxy groups having 1 to 10 C atoms, preferably having 1 to 6 C atoms, halogens, hydrogen, acyloxy groups having 2 to 10 C atoms and in particular having 2 to 6 C atoms, or $NR'_2$ groups, where the radicals R' may be identical or different and are selected from hydrogen or alkyl having 1 to 10 C atoms, in particular having 1 to 6 C atoms. Suitable alkoxy groups are, for example, methoxy, ethoxy, propoxy or butoxy groups. Suitable halogens are, in particular, Br and Cl. Examples of acyloxy groups are acetoxy and propoxy groups. Suitable hydrolytically removable radicals are furthermore also oximes. The oximes here may be substituted by hydrogen or any desired organic radicals. The radicals R are preferably alkoxy groups and in particular methoxy or ethoxy groups.

A spacer $S_P$ which functions as connecting element between the Si head group and the hydrophilic block $A_{hp}$ and takes on a bridging function for the purposes of the present invention is covalently bonded to the above-mentioned head group. The group $S_P$ is either —O— or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms.

The $C_1$-$C_{18}$-alkyl group of $S_P$ is, for example, a methyl, ethyl, isopropyl, propyl, butyl, sec-butyl or tert-butyl, furthermore also pentyl, 1-, 2- or 3-methylbutyl, 1,1-, 1,2- or 2,2-dimethylpropyl, 1-ethylpropyl, hexyl, heptyl, octyl, nonyl, decyl, undecyl, dodecyl, tridecyl or tetradecyl group. It may optionally be perfluorinated, for example as difluoromethyl, tetrafluoroethyl, hexafluoropropyl or octafluorobutyl group.

A straight-chain or branched alkenyl having 2 to 18 C atoms, where a plurality of double bonds may also be present, is, for example, vinyl, allyl, 2- or 3-butenyl, isobutenyl, sec-butenyl, furthermore 4-pentenyl, isopentenyl, hexenyl, heptenyl, octenyl, —$C_9H_{16}$, —$C_{10}H_{18}$ to —$C_{18}H_{34}$, preferably allyl, 2- or 3-butenyl, isobutenyl, sec-butenyl, furthermore preferably 4-pentenyl, isopentenyl or hexenyl.

A straight-chain or branched alkynyl having 2 to 18 C atoms, where a plurality of triple bonds may also be present, is, for example, ethynyl, 1- or 2-propynyl, 2- or 3-butynyl, furthermore 4-pentynyl, 3-pentynyl, hexynyl, heptynyl, octynyl, —C$_9$H$_{14}$, —C$_{10}$H$_{16}$ to —C$_{18}$H$_{32}$, preferably ethynyl, 1- or 2-propynyl, 2- or 3-butynyl, 4-pentynyl, 3-pentynyl or hexynyl.

Unsubstituted saturated or partially or fully unsaturated cycloalkyl groups having 3-7 C atoms may be cyclopropyl, cyclobutyl, cyclopentyl, cyclohexyl, cycloheptyl, cyclopentenyl, cyclopenta-1,3-dienyl, cyclohexenyl, cyclohexa-1,3-dienyl, cyclohexa-1,4-dienyl, phenyl, cycloheptenyl, cyclohepta-1,3-dienyl, cyclohepta-1,4-dienyl or cyclohepta-1,5-dienyl groups, which [lacuna] substituted by C$_1$- to C$_6$-alkyl groups.

The spacer group S$_P$ is followed by the hydrophilic block A$_{hp}$. This may be selected from nonionic, cationic, anionic or zwitterionic hydrophilic polymers, oligomers or groups. In the simplest embodiment, the hydrophilic block may comprise ammonium, sulfonium, phosphonium groups, alkyl chains containing carboxyl, sulfate and phosphate side groups, where these may also be in the form of the corresponding salt, partially esterified anhydrides containing a free acid or salt group, OH-substituted alkyl or cycloalkyl chains (for example sugar) containing at least one OH group, NH- and SH-substituted alkyl or cycloalkyl chains or mono-, di-, tri- or oligo-ethylene glycol groups. The length of the corresponding alkyl chains can be 1 to 20 C atoms, preferably 1 to 6 C atoms.

The nonionic, cationic, anionic or zwitterionic hydrophilic polymers, oligomers or groups here can be prepared from corresponding monomers by polymerisation by methods known in general terms to the person skilled in the art. Suitable hydrophilic monomers contain at least one dispersing functional group from the group consisting of
(i) functional groups which can be converted into anions by neutralisers, and anionic groups, and/or
(ii) functional groups which can be converted into cations by neutralisers and/or quaternising agents, and cationic groups, and/or
(iii) nonionic hydrophilic groups.

The functional groups (i) are preferably selected from the group consisting of carboxyl, sulfonyl and phosphonyl groups, acidic sulfate and phosphate groups and carboxylate, sulfonate, phosphonate, sulfate ester and phosphate ester groups, the functional groups (ii) are preferably selected from the group consisting of primary, secondary and tertiary amino groups, primary, secondary, tertiary and quaternary ammonium groups, quaternary phosphonium groups and tertiary sulfonium groups, and the functional groups (iii) are preferably selected from the group consisting of omega-hydroxy- and omega-alkoxypoly(alkylene oxide)-1-yl groups.

If unneutralised, the primary and secondary amino groups can also serve as isocyanate-reactive functional groups.

Examples of highly suitable hydrophilic monomers containing functional groups (i) are acrylic acid, methacrylic acid, beta-carboxyethyl acrylate, ethacrylic acid, crotonic acid, maleic acid, fumaric acid or itaconic acid; olefinically unsaturated sulfonic or phosphonic acids or partial esters thereof; or mono(meth)acryloyloxyethyl maleate, mono(meth)acryloyloxyethyl succinate or mono(meth)acryloyloxyethyl phthalate, in particular acrylic acid and methacrylic acid.

Examples of highly suitable hydrophilic monomers containing functional groups (ii) are 2-aminoethyl acrylate and methacrylate or allylamine.

Examples of highly suitable hydrophilic monomers containing functional groups (iii) are omega-hydroxy- or omega-methoxypoly(ethylene oxide)-1-yl, omega-methoxypoly(propylene oxide)-1-yl or omega-methoxypoly(ethylene oxide-co-polypropylene oxide)-1-yl acrylate or methacrylate, and hydroxyl-substituted ethylenes, acrylates or methacrylates, such as, for example, hydroxyethyl methacrylate.

Examples of suitable monomers for the formation of zwitterionic hydrophilic polymers are those in which a betaine structure occurs in the side chain. The side group is preferably selected from —(CH$_2$)$_m$—(N$^+$(CH$_3$)$_2$)—(CH$_2$)$_n$—SO$_3^-$, —(CH$_2$)$_m$—(N$^+$(CH$_3$)$_2$)—(CH$_2$)$_n$—PO$_3^{2-}$, —(CH$_2$)$_m$—(N$^+$(CH$_3$)$_2$)—(CH$_2$)$_n$—O—PO$_3^{2-}$ or —(CH$_2$)$_m$—(P$^+$(CH$_3$)$_2$)—(CH$_2$)$_n$—SO$_3^-$, where m stands for an integer from the range from 1 to 30, preferably from the range 1 to 6, particularly preferably 2, and n stands for an integer from the range from 1 to 30, preferably from the range 1 to 8, particularly preferably 3.

It may be particularly preferred here for at least one structural unit of the hydrophilic block to contain a phosphonium or sulfonium radical.

In general, corresponding structures can be prepared in accordance with the following scheme:

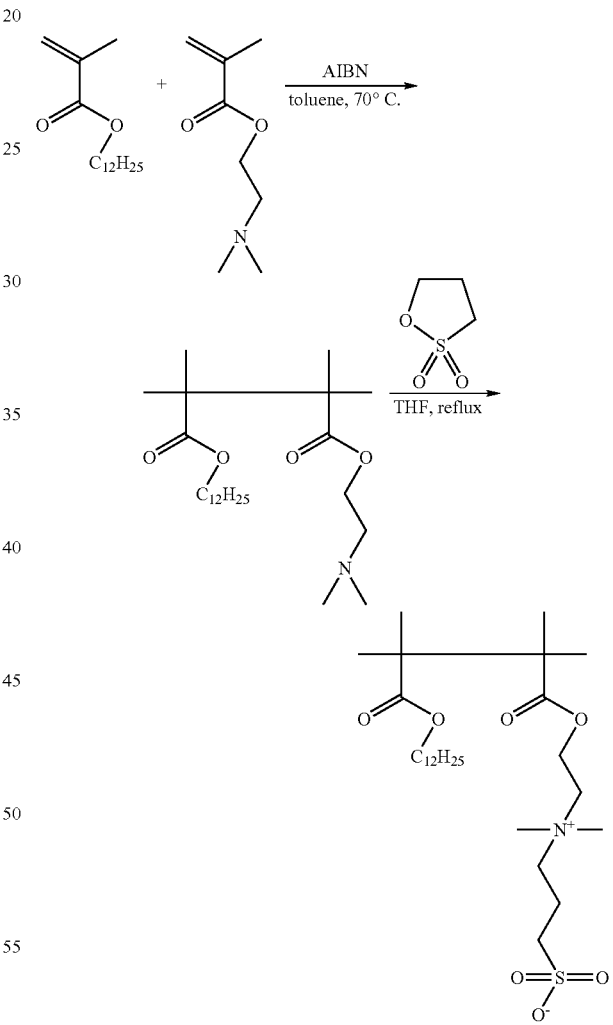

The desired amounts of lauryl methacrylate (LMA) and dimethylaminoethyl methacrylate (DMAEMA) are copolymerised here by known methods, preferably by means of free radicals in toluene by addition of AIBN. A betaine structure is subsequently obtained by reaction of the amine with 1,3-propane sultone by known methods.

In another variant of the invention, it is preferred to employ a copolymer essentially consisting of lauryl methacrylate (LMA) and hydroxyethyl methacrylate (HEMA), which can be prepared in a known manner by free-radical polymerisation using AIBN in toluene.

When selecting the hydrophilic monomers, it must be ensured that the hydrophilic monomers containing functional groups (i) and the hydrophilic monomers containing functional groups (ii) are preferably combined with one another in such a way that no insoluble salts or complexes are formed. By contrast, the hydrophilic monomers containing functional groups (i) or containing functional groups (ii) can be combined as desired with the hydrophilic monomers containing functional groups (iii).

Of the hydrophilic monomers described above, particular preference is given to the use of the monomers containing functional groups (i).

The neutralisers for the functional groups (i) which can be converted into anions are preferably selected from the group consisting of ammonia, trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine, triethanolamine, diethylenetriamine and triethylenetetramine, and the neutralisers for the functional groups (ii) which can be converted into cations are preferably selected from the group consisting of sulfuric acid, hydrochloric acid, phosphoric acid, formic acid, acetic acid, lactic acid, dimethylolpropionic acid and citric acid.

The hydrophilic block is very particularly preferably selected from mono-, di- and triethylene glycol structural units.

The hydrophobic block $B_{hb}$ follows bonded to the hydrophilic block $A_{hp}$. The block $B_{hb}$ is based on hydrophobic groups or, like the hydrophilic block, on hydrophobic monomers which are suitable for polymerisation.

Examples of suitable hydrophobic groups are straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms. Examples of such groups have already been mentioned above. In addition, aryl, polyaryl, aryl-$C_1$-$C_6$-alkyl or esters having more than 2 C atoms are suitable. The said groups may, in addition, also be substituted, in particular by halogens, where perfluorinated groups are particularly suitable.

Aryl-$C_1$-$C_6$-alkyl denotes, for example, benzyl, phenylethyl, phenylpropyl, phenylbutyl, phenylpentyl or phenylhexyl, where both the phenyl ring and the alkylene chain may be partially or fully substituted by F as described above, particularly preferably benzyl or phenylpropyl.

Examples of suitable hydrophobic olefinically unsaturated monomers for the hydrophobic block $B_{hb}$ are (1) essentially acid group-free esters of olefinically unsaturated acids, such as (meth)acrylic acid, crotonic acid, ethacrylic acid, vinylphosphonic acid or vinylsulfonic acid alkyl or cycloalkyl esters having up to 20 carbon atoms in the alkyl radical, in particular methyl, ethyl, propyl, n-butyl, sec-butyl, tert-butyl, hexyl, ethylhexyl, stearyl and lauryl acrylate, methacrylate, crotonate, ethacrylate or vinylphosphonate or vinylsulfonate; cycloaliphatic(meth)acrylic acid, crotonic acid, ethacrylic acid, vinylphosphonic acid or vinylsulfonic acid esters, in particular cyclohexyl, isobornyl, dicyclopentadienyl, octahydro-4,7-methano-1H-indenemethanol or tert-butylcyclohexyl(meth)acrylate, crotonate, ethacrylate, vinylphosphonate or vinylsulfonate. These may contain, in minor amounts, polyfunctional(meth)acrylic acid, crotonic acid or ethacrylic acid alkyl or cycloalkyl esters, such as ethylene glycol, propylene glycol, diethylene glycol, dipropylene glycol, butylene glycol, pentane-1,5-diol, hexane-1,6-diol, octahydro-4,7-methano-1H-indene-dimethanol or cyclohexane-1,2-, -1,3- or -1,4-diol di(meth)acrylate, trimethylolpropane tri(meth)acrylate or pentaerythritol tetra(meth)acrylate, and the analogous ethacrylates or crotonates. For the purposes of the present invention, minor amounts of polyfunctional monomers (1) are taken to mean amounts which do not result in crosslinking or gelling of the polymers;

(2) monomers which carry at least one hydroxyl group or hydroxymethylamino group per molecule and are essentially free from acid groups, such as hydroxyalkyl esters of alpha,beta-olefinically unsaturated carboxylic acids, such as hydroxyalkyl esters of acrylic acid, methacrylic acid and ethacrylic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl)cyclohexane, octahydro-4,7-methano-1H-indene-dimethanol or methylpropanediol monoacrylate, monomethacrylate, monoethacrylate or monocrotonate; or products of the reaction of cyclic esters, such as, for example, epsilon-caprolactone, and these hydroxyalkyl esters;

olefinically unsaturated alcohols, such as allyl alcohol;

allyl ethers of polyols, such as trimethylolpropane monoallyl ether or pentaerythritol mono-, di- or triallyl ether. The polyfunctional monomers are generally only used in minor amounts. For the purposes of the present invention, minor amounts of polyfunctional monomers are taken to mean amounts which do not result in crosslinking or gelling of the polymers;

products of the reaction of alpha,beta-olefinically carboxylic acids with glycidyl esters of an alpha-branched monocarboxylic acid having 5 to 18 carbon atoms in the molecule. The reaction of acrylic or methacrylic acid with the glycidyl ester of a carboxylic acid containing a tertiary alpha-carbon atom can be carried out before, during or after the polymerisation reaction. The monomer (2) employed is preferably the product of the reaction of acrylic and/or methacrylic acid with the glycidyl ester of Versatic® acid. This glycidyl ester is commercially available under the name Cardura® E10. In addition, reference is made to Römpp Lexikon Lacke und Druckfarben [Römpp's Lexicon of Surface Coatings and Printing Inks], Georg Thieme Verlag, Stuttgart, N.Y., 1998, pages 605 and 606;

formaldehyde adducts of aminoalkyl esters of alpha,beta-olefinically unsaturated carboxylic acids and of alpha,beta-unsaturated carboxamides, such as N-methylol- and N,N-dimethylolaminoethyl acrylate, -aminoethyl methacrylate, -acrylamide and -methacrylamide; and olefinically unsaturated monomers containing acryloxysilane groups and hydroxyl groups, which can be prepared by reaction of hydroxyl-functional silanes with epichlorohydrin 30 and subsequent reaction of the intermediate with an alpha,beta-olefinically unsaturated carboxylic acid, in particular acrylic acid or methacrylic acid, or hydroxyalkyl esters thereof;

(3) vinyl esters of alpha-branched monocarboxylic acids having 5 to 18 carbon atoms in the molecule, such as the vinyl esters of Versatic® acid, which are marketed under the trade name VeoVa®;

(4) cyclic and/or acyclic olefins, such as ethylene, propylene, but-1-ene, pent-1-ene, hex-1-ene, cyclohexene, cyclopentene, norbornene, butadiene, isoprene, cyclopentadiene and/or dicyclopentadiene;

(5) amides of alpha,beta-olefinically unsaturated carboxylic acids, such as (meth)acrylamide, N-methyl-, N,N-dimethyl-, N-ethyl-, N,N-diethyl-, N-propyl-, N,N-dipropyl-, N-butyl-, N,N-dibutyl- and/or N,N-cyclohexylmethyl(meth)acrylamide;

(6) monomers containing epoxide groups, such as the glycidyl esters of acrylic acid, methacrylic acid, ethacrylic acid, crotonic acid, maleic acid, fumaric acid and/or itaconic acid;

(7) vinylaromatic hydrocarbons, such as styrene, vinyltoluene or alpha-alkylstyrenes, in particular alpha-methylstyrene;

(8) nitriles, such as acrylonitrile or methacrylonitrile;

(9) vinyl compounds selected from the group consisting of vinyl halides, such as vinyl chloride, vinyl fluoride, vinylidene dichloride, vinylidene difluoride; vinylamides, such as N-vinylpyrrolidone; vinyl ethers, such as ethyl vinyl ether, n-propyl vinyl ether, isopropyl vinyl ether, n-butyl vinyl ether, isobutyl vinyl ether and vinyl cyclohexyl ether; and vinyl esters, such as vinyl acetate, vinyl propionate and vinyl butyrate;

(10) allyl compounds selected from the group consisting of allyl ethers and esters, such as propyl allyl ether, butyl allyl ether, ethylene glycol diallyl ether, trimethylolpropane triallyl ether or allyl acetate or allyl propionate; regarding the polyfunctional monomers, the comments made above apply correspondingly;

(11) siloxane or polysiloxane monomers, which may be substituted by saturated, unsaturated, straight-chain or branched alkyl groups or other hydrophobic groups already mentioned above. Also suitable are polysiloxane macromonomers which have a number average molecular weight Mn of 1000 to 40,000 and contain on average 0.5 to 2.5 ethylenically unsaturated double bonds per molecule, such as polysiloxane macromonomers which have a number average molecular weight Mn of 1000 to 40,000 and contain on average 0.5 to 2.5 ethylenically unsaturated double bonds per molecule, in particular polysiloxane macromonomers which have a number average molecular weight Mn of 2000 to 20,000, particularly preferably 2500 to 10,000 and in particular 3000 to 7000 and contain on average 0.5 to 2.5, preferably 0.5 to 1.5, ethylenically unsaturated double bonds per molecule, as described in DE 38 07 571 A 1 on pages 5 to 7, DE 37 06 095 A 1 in columns 3 to 7, EP 0 358 153 B 1 on pages 3 to 6, in U.S. Pat. No. 4,754,014 A 1 in columns 5 to 9, in DE 44 21 823 A 1 or in the international patent application WO 92/22615 on page 12, line 18, to page 18, line 10; and

(12) monomers containing carbamate or allophanate groups, such as acryloyloxy- or methacryloyloxyethyl, -propyl or -butyl carbamate or allophanate; further examples of suitable monomers which contain carbamate groups are described in the patent specifications U.S. Pat. No. 3,479,328 A 1, U.S. Pat. No. 3,674,838 A 1, U.S. Pat. No. 4,126,747 A 1, U.S. Pat. No. 4,279,833 A 1 or U.S. Pat. No. 4,340,497 A1.

The respective hydrophilic and hydrophobic blocks can basically be combined with one another in any desired manner. The amphiphilic silanes preferably have an HLB value in the range 2-19, preferably in the range 4-15. The HLB value here is defined as $$HLB = \frac{\text{mass of polar fractions}}{\text{molar mass}} \cdot 20$$

and indicates whether the silane behaves more hydrophilically or hydrophobically, i.e. which of the two blocks $A_{hp}$ and $B_{hb}$ dominates the properties of the silane. The HLB value is calculated theoretically and arises from the mass proportions of hydrophilic and hydrophobic groups. An HLB value of 0 suggests a lipophilic compound, while a chemical compound having an HLB value of 20 has only hydrophilic components.

The amphiphilic silanes are furthermore distinguished by the fact that at least one reactive functional group on $A_{hp}$ and/or $B_{hb}$ is in bonded form. The reactive functional group is preferably bonded to the hydrophobic block $B_{hb}$ and particularly preferably to the end of the hydrophobic block. In the preferred embodiment, the head group $(R)_3Si$ and the reactive functional group have the greatest possible separation. This enables a particularly flexible design of the chain lengths of blocks $A_{hp}$ and $B_{hb}$ without significantly restricting the possible reactivity of the reactive groups, for example with the ambient medium.

The reactive functional group can be selected from silyl groups containing hydrolytically removable radicals, OH, carboxyl, NH, SH groups, halogens or reactive groups containing double bonds, such as, for example, acrylate or vinyl groups. Suitable silyl groups containing hydrolytically removable radicals have already been described above in the description of the head group $(R)_3Si$. The reactive group is preferably an OH group.

After the destabilisation, the nanoparticles according to the invention are isolated. This is carried out by centrifugation, filtration and optionally by washing with water and/or alcohol.

The surface-modified nanoparticles obtained in this way can be dispersed in a new medium in a simple manner. In the simplest case, the nanoparticles are mixed with the dispersion medium.

The present invention likewise relates to the use of the nanoparticles according to the invention in paints, coatings, adhesives and plastics, in particular in transparent applications. Thus, incorporation of the particles according to the invention, in particular in the case of nanoparticles, enables the chemical, thermal and mechanical stability of polymers to be improved or parts of the electromagnetic spectrum to be influenced specifically. Protection against UV rays should be particularly emphasised at this point.

The incorporation into polymers and surface coatings can be carried out by conventional methods for the preparation of polymer compositions. For example, the polymer material can be mixed with nanoparticles according to the invention, preferably with the dried particles, preferably in an extruder or compounder, and incorporated into two-component coating systems by mixing the nanoparticles with the polymer starting components of two-component coating systems. Preferred polymers are polycarbonate (PC), polyethylene terephthalate (PETP), polyimide (PI), polystyrene (PS), polymethyl methacrylate (PMMA), polyolefins, preferably polybutadiene and polyisoprene, and copolymers which contain at least a proportion of one of the said polymers, as well as two-component coating systems.

The following examples merely illustrate the invention without restricting the scope of protection. In particular, the features, properties and advantages described therein of the defined compound(s) on which the example in question is based can also be applied to other substances and compounds which are not mentioned in detail, but fall within the scope of protection of the claims, unless stated otherwise elsewhere.

EXAMPLES

Surface Modification 4.16 g of a 30% by weight dispersion of $SiO_2$ nanoparticles (particle diameter 9 nm) in water are diluted to 5% by weight with isopropanol (26 ml). Various amounts of hexadecyltrimethoxysilane (HDTMS) as surface modifier are added to this single-phase dispersion (see Table 1.1). After a reaction time of 12 h, the polarity of the reaction mixture is increased greatly by the addition of 15 ml of water as external factor, causing the surface-modified particles to precipitate. The particles are filtered off and taken up in n-butyl acetate.

TABLE 1.1

Experimental overview of functionalised $SiO_2$ nanoparticles:

| Sample | $SiO_2$/butyl acetate [% by wt.] | Surface coverage* [gr/nm$^2$] | HDTMS** [µl] |
|---|---|---|---|
| 1 (Reference) | 10 | — | — |
| 2 | 10 | 0.1 | 19 |
| 3 | 10 | 0.3 | 58 |
| 4 | 10 | 0.8 | 155 |
| 5 | 10 | 1.0 | 194 |
| 6*** | 10 | 0.8 | 155 |
| 7*** | 10 | 1.0 | 194 |

*based on the spec. surface area of the nanoparticles ($A_{sp}$ = 300 m$^2$/g)
**hexadecyltrimethoxysilane
***without isopropanol Isopropanol serves as solubiliser between the dispersion of $SiO_2$ nanoparticles and the HDTMS during the surface modification. Without isopropanol (see Table 2.1), the silane is in two-phase form at the beginning of the surface modification and the particles precipitate on advanced silanation in water. Measurement of the diffuse and directed scattering of samples 6 and 7 is therefore also impossible (see turbidity experiments).

Turbidity Experiments:

Measuring instrument: Lambda 900 UV/VIS/NIR spectrometer with 150 mm integration sphere The dispersions are measured in transmission in a cell thickness of 0.5 cm.

The directed and diffuse components are calculated (Table 2.1).

TABLE 2.1

Diffuse and directed scattering at 450 nm (measured in butyl acetate)

| Samples | Surface coverage [gr/nm$^2$] | Transm. diffuse [%] | Transm. dir. [%] |
|---|---|---|---|
| Butyl acetate | — | 0.42 | 92.86 |
| 1 | — | 43.69 | 7.89 |
| 2 | 0.1 | 16.10 | 51.74 |
| 3 | 0.3 | 8.08 | 68.52 |
| 4 | 0.8 | 4.12 | 81.82 |
| 5 | 1.0 | 5.89 | 80.55 |
| 6* | 0.8 | — | — |
| 7* | 1.0 | — | — |

*no stable dispersion during the measurement

The results of the turbidity measurements document the increasing proportion of diffuse transmission and consequently the increase in directed transmission on decreasing surface coverage with the silane. The surface modification process ensures agglomerate-free nanoparticles, which are characterised by a small diffuse component of the degree of transmission compared with the reference experiment (without surface modifier or without isopropanol). The optical appearance of the samples (0.3-1.0 g/nm$^2$) is transparent (opalescent).

The invention claimed is:

1. Surface-modified inorganic particles, obtainable by a process in which, (a), inorganic particles based on silicon dioxide and at least one surface modifier are reacted with one another in a solvent or solvent mixture, and, (b), the resultant reaction mixture is destabilized by the action of a change in the pH after the surface modification, addition of solvent or addition of solubilizer to the particle dispersion, or addition of a salt to give the surface-modified inorganic particles, wherein the surface modifier is an organofunctional silane.

2. Surface-modified nanoparticles according to claim 1, wherein the inorganic particles are suspended in a solvent or solvent mixture before application of the surface modifier.

3. Surface-modified particles according to claim 1, having an average particle size, determined by dynamic light scattering or transmission electron microscope, of 3 to 200 nm.

4. Surface-modified particles according to claim 1, wherein the solvent or solvent mixture encompasses water, alcohols, ketones and/or ethers.

5. Surface-modified particles according to claim 1, wherein destabilization in (b) is by addition of solvent or solubilizer.

6. Surface-modified particles according to claim 1, wherein the surface modifier is covalently bonded to the surface of the inorganic particles.

7. Surface-modified particles according to claim 1, wherein the particles are separated off and/or dried.

8. Surface-modified particles according to claim 1, which particles are redispersible in organic solvents.

9. Surface-modified particles according to claim 1, which particles can be dispersed to give a transparent dispersion, measured via the turbidity of the dispersion, which is determined by means of a Lambda 900 UV/VIS/NIR spectrometer with 150 mm integration sphere.

10. A process for the production of surface-modified inorganic particles according to claim 1, in which, (a), the inorganic particles and the surface modifier are reacted with one another in a solvent or solvent mixture, and (b), the resultant reaction mixture is destabilized by a change in the pH after the surface modification, addition of solvent or addition of solubilizer to the particle dispersion, or addition of a salt to give the surface-modified inorganic particles.

11. The process according to claim 10, wherein the particles are separated off and/or dried.

12. A surface coating, adhesive or plastic comprising surface-modified particles according to claim 1.

13. A method of improving the chemical, thermal and mechanical stability of polymers comprising adding surface modified particles according to claim 1 to a polymer composition.

14. Surface-modified inorganic particles according to claim 1, wherein the particles are based on Ag, Cu, Fe, Au, Pd or Pt metal.

* * * * *